3,669,610
FLAME-RESISTANT WOOL

Mendel Friedman, Lafayette, Calif., assignor to the United States of America as represented by the Secretary of Agriculture
No Drawing. Filed Feb. 12, 1970, Ser. No. 11,015
Int. Cl. D06m 3/02, 13/00
U.S. Cl. 8—128
2 Claims

ABSTRACT OF THE DISCLOSURE

The flame resistance of wool fibers and blends of wool fibers is enhanced through reaction with bis-(β-chloroethyl) vinyl phosphonate in the presence of a free radical generating catalyst. The wool fibers may be modified by a reducing agent prior to contact with the phosphonate.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel modified wool products which are particularly characterized by flame resistance. The objects of the invention also include novel methods for preparing these modified wool products. Further objects of the invention will be evident from the following description wherein parts and percentages are by weight unless otherwise specified.

Although wool does not ignite readily, flames will propagate in wool once ignition has occurred. A need, therefore, exists to flame-proof wool and blends of wool with other fibers (e.g., cotton) for many uses such as airplane upholstery, carpeting, blankets, and the like. A particular aim of the invention is to fulfill this need.

It has been found in accordance with the invention that wool modified with bis-(β-chloroethyl) vinyl phosphonate has the desirable characteristic of being flame resistant. Moreover, the flame-resistant property is retained despite laundering and dry cleaning of the modified wool products. The durability of the modification achieved by the invention is believed to be due to the fact that the phosphonate is chemically combined with the wool. However, the mechanism by which this chemical combination or bonding occurs is not known.

Another valuable asset of the invention is that the modification does not impair the intrinsic properties of the wool. For example, the treatment does not impair the color or tensile strength of the textile. The products of the invention are suitable for all conventional uses of textiles, such as fabrication of carpeting, upholstery and drapery fabrics, garments, and the like.

The compound bis-(β-chloroethyl) vinyl phosphonate used in accordance with the invention is a known substance having the structure:

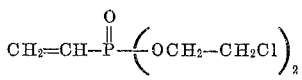

For the sake of brevity, this compound will be hereinafter referred to as VP.

The chemical modification of wool in accordance with the invention involves, essentially, contacting wool in the presence of a conventional free radical initiator with VP, the latter being preferably dissolved in an inert solvent such as water, an alcohol such as methanol, ethanol, normal or iso-propanol, blends of water and any of said alcohols, etc. As the free radical initiator it is preferred to use ceric ammonium sulphate or other compound which provides ceric ions. Also suitable are per-compounds such as alkali metal persulphates. These are preferably used in a redox system, that is, a combination of an alkali metal persulphate and a substance—such as an alkali metal sulphite or bisulphite, ferrous sulphate or acetate, a hydrazine salt such as the chloride or sulphate, or silver nitrate—which acts as a reducing agent and interacts with the persulphate to yield the desired free radicals.

Usually as a matter of convenience, the reaction is conducted at room temperature. However, the temperature may in general be from about 20 to about 100° C., the rate of reaction increasing as the temperature is increased.

It is preferred to exclude atmospheric oxygen from the reaction system and such exclusion is readily attained by sweeping a non-oxidizing gas such as nitrogen or helium through the system.

The amount of VP taken up by the wool may be varied by adjustment of such factors as the proportion of VP to wool in the reaction system, the temperature, time of reaction, etc. In general, the reaction conditions are selected so that the wool exhibits an increase in weight (due to uptake of VP) of from about 5 to about 40% (dry basis). It is, of course, obvious that the higher uptakes of VP in this range provide a greater degree of flame resistance.

After the reaction of wool and VP has been carried out, the modified wool is mechanically treated as by wringing, pressing, centrifuging, or the like to remove excess reagent, solvent, etc. Any residual materials may be removed by rinsing with water or by washing in a conventional soap and water or detergent and water formulation. The product is then dried and is ready for use or sale. The drying may be at room temperature or at an elevated temperature, for example, in an oven at about 50-100° C. for 1 to 4 hours.

The process of the invention may be applied to wool in any physical form, for example, yarns, bulk fibers, top, webbing, roving, woven or knitted fabrics, etc. The textile materials may be of all-wool composition or they may be part-wool blends, for example, blends containing at least 25% wool, the remainder being a different fiber, e.g., a natural fiber such as cotton, linen, jute, ramie, sisal, kenaf etc., or a synthetic fiber such as rayon, acetate, acrylic, polyester, saran, azylon, nytril, nylon, Spandex, vinyl, olefine, vinyon, or glass fibers.

In an alternative modification of the invention, the wool is first reduced and then reacted with VP. The reduction of wool is well known in the art, and may be carried out by any of the procedures disclosed in the literature. Such processes are disclosed, for example, in the following U.S. patents: Harris 2,434,562; Haefele et al. 2,615,783; Moore et al. 2,850,351; and Moore 2,933,365. After the wool has been reduced it is reacted with VP. This involves contacting the reduced wool, in the presence of an alkaline substance, with VP, the latter being preferably dissolved in an inert solvent such as water, an alcohol such as methanol, ethanol, isopropanol, n-propanol, blends of water and any of said alcohols, etc. To provide the alkaline conditions there is added to the reaction system a moderately alkaline material such as an alkali metal acetate or bicarbonate, an amine such as pyridine, dimethyl aniline, quinoline, or Tris—an abbreviated name for tris-(hydroxymethyl) aminomethane. Usually, enough of the alkaline material is added to provide a pH of about 7.5 to 10.

Usually as a matter of convenience, the reaction is conducted at room temperature. However, the temperature may, in general, be from about 20 to 100° C., the rate of reaction increasing as the temperature is increased.

It is preferred to exclude atmospheric oxygen from the reaction system and such exclusion is readily attained by sweeping a non-oxidizing gas such as nitrogen or helium through the system.

The amount of VP taken up by the wool may be varied by adjustment of such factors as the proportion of VP to reduced wool in the reaction system, the temperature, the time of reaction, etc. In general, the reaction conditions are selected so that the reduced wool takes up about 5 to 40% (on dry basis) of VP. It is, of course, obvious that the higher uptakes of VP in this range provide a greater degree of flame resistance.

After the reaction of the reduced wool and VP has been carried out, the modified wool product is treated to remove unreacted materials, solvent, etc. by the usual treatments such as wringing, pressing, centrifuging, preferably in combination with rinsing or washing. The product is then dried and is ready for use or sale. This embodiment of the invention is applicable to wool and wool blends in any physical form as previously described in connection with the first embodiment of the invention.

EXAMPLES

The invention is further demonstrated by the following illustrative examples. The test referred to therein was carried out as follows:

Flame tests

Flame tests were carried out in triplicate with an electromechanical Flammability Tester (Model No. 7633 E, United States Testing Co., Hoboken, N.J.) according to ASTM procedure D1230 with the following modifications: (a) The fabric holder was placed in an upright position (90° angle) instead of a 45° angle; and (b) the flame was applied until fabric caught fire instead of for only one second. With this test a longer burning time signifies a slower rate of flame propagation, hence a lesser degree of flammability.

EXAMPLE 1

(A) To a sample of wool fabric (4.32 g.) in a 500 ml. flask was added 250 ml. of $H_2O$ and 15 ml. of VP. Nitrogen was bubbled through for 25 minutes and 10 ml. of a ceric ammonium sulphate solution (made by dissolving 3.32 g. of ceric ammonium sulphate in 100 ml. of 1 N $H_2SO_4$) was added under nitrogen. The flask was shaken for 48 hours at room temperature with introduction of an additional 10 ml. of the ceric ammonium sulphate solution at the 24th hour. The fabric was then removed, rinsed with water, and air-dried. The uptake of VP by the wool was found to be 36.2%.

(B) Additional lots of VP-modified wool were prepared using the basic procedure described above but with the following variations:

(B1) The amount of VP used in the reaction was 10 ml. The product had an uptake of 23.6% VP.

(B2) The amount of VP used in the reaction was 5 ml. The product had an uptake of 2.72% VP.

(B3) The amount of VP used in the reaction was 5 ml. and the time of reaction was 15 minutes. The product had an uptake of 2.05% VP.

(B4) In this case the amount of VP was 10 ml., the solvent in the reaction was 10% propanol-water, and the time of reaction was 24 hours. The product had an uptake of 17.3% VP.

(B5) The fabric treated was a 50/50 wool-cotton blend. The reaction conditions were as in B4. The product had an uptake of 24.8% VP.

(C) The samples of VP-modified fabric and the untreated fabrics were then subjected to the flammability test described above. The results are given in Table I.

TABLE I

| Product | Fabric | Uptake of VP, percent | Burning time,[a] sec. |
|---|---|---|---|
| A | Wool | 36.2 | Non-burning.[b] |
| B1 | do | 23.6 | Do.[b] |
| B2 | do | 2.72 | 22.0 |
| B3 | do | 2.05 | 15.1 |
| Control | do | Untreated | 9.4 |
| B4 | do | 17.3 | Non-burning.[b] |
| B5 | Wool-cotton | 24.8 | Do.[b] |
| Control | do | Untreated | 8.0 |

[a] Average of 3 determinations.
[b] Chars but does not ignite after a flame contact of 2 minutes.

EXAMPLE 2

To a sample of wool fabric (4.34 g.) in a 500 ml. flask was added 150 ml. of n-propanol, 150 ml. of pH 7.6 Tris buffer (0.1 N), and 1.6 ml. of tri-n-butyl phosphine. After nitrogen had been bubbled through the solution for 10 minutes, it was shaken for 48 hours at room temperature. To the reduced wool was then added 8 ml. of VP. Nitrogen was bubbled through for 5 minutes, then the reaction mixture was shaken for 48 hours at room temperature. The treated wool was removed, rinsed with water and air-dried. The uptake of VP was 9.2%. The product was tested for flammability and it was found to be non-burning; it charred but did not ignite after a flame contact of 2 minutes. A sample of the untreated wool exhibited a burning time of 9.4 seconds.

Having thus described the invention, what is claimed is:

1. A process for modifying wool to make it flame resistant which comprises contacting reduced wool, under moderately alkaline conditions, with bis-($\beta$-chloroethyl) vinyl phosphonate in an inert solvent for said phosphonate, and maintaining said contact at a temperature of about 20 to about 100° C. until there is formed a modified reduced wool containing about from 5 to 40% of the phosphonate.

2. Flame resistant modified wool fibers comprising reduced wool having bis-($\beta$-chloroethyl) vinyl phosphonate chemically combined therewith in the amount from about 5 to about 40%, produced by the process of claim 1.

References Cited

UNITED STATES PATENTS

| 2,714,100 | 7/1955 | Dock Fon Toy | 8—P |
| 3,083,118 | 3/1963 | Bridgeford | 8—128 |
| 3,101,276 | 8/1963 | Hendricks | 8—P |
| 3,505,003 | 4/1970 | Vullo | 8—128 |
| 3,514,385 | 5/1970 | Magat et al. | 8—128 |
| 3,083,118 | 3/1963 | Bridgeford | 8—127.6 |

GEORGE F. LESMES, Primary Examiner

J. CANNON, Assistant Examiner

U.S. Cl. X.R.

8—115.5, 115.7, 116, 120, 127.6, 129, Dig. 21, Dig. 4, Dig. 9, Dig. 10, Dig. 18; 260—Dig. 24; 117—136; 106—15 FP